United States Patent
Kert (10) Patent No.: US 8,421,839 B2
(45) Date of Patent: Apr. 16, 2013

(54) PERIPHERAL DEVICE FOR COMMUNICATION OVER A COMMUNICATIONS SYSTEM

(75) Inventor: Kaido Kert, Tallinn (EE)

(73) Assignee: Skype, Dublin (IE)

( * ) Notice: Subject to any disclaimer, the term of this patent is extended or adjusted under 35 U.S.C. 154(b) by 841 days.

(21) Appl. No.: 12/583,007

(22) Filed: Aug. 12, 2009

(65) Prior Publication Data

US 2010/0060716 A1    Mar. 11, 2010

(30) Foreign Application Priority Data

| Sep. 5, 2008 | (GB) | 0816271.1 |
| Sep. 5, 2008 | (GB) | 0816275.2 |
| Sep. 5, 2008 | (GB) | 0816276.0 |
| Sep. 5, 2008 | (GB) | 0816278.6 |
| Sep. 5, 2008 | (GB) | 0816279.4 |
| Sep. 5, 2008 | (GB) | 0816280.2 |
| Sep. 5, 2008 | (GB) | 0816281.0 |
| May 6, 2009 | (GB) | 0907818.9 |

(51) Int. Cl.
*H04N 7/14* (2006.01)

(52) U.S. Cl.
USPC ............................ 348/14.01; 348/207.1

(58) Field of Classification Search ........ 348/14.01, 348/14.03, 14.04, 207.1; 370/352
See application file for complete search history.

(56) References Cited

U.S. PATENT DOCUMENTS

| 5,506,572 A | 4/1996 | Hills et al. |
| 5,587,928 A | 12/1996 | Jones et al. |
| 5,812,770 A | 9/1998 | Sakai |
| 5,856,821 A | 1/1999 | Funahashi |
| 5,923,737 A | 7/1999 | Weishut et al. |
| 6,061,434 A | 5/2000 | Corbett |
| 6,151,619 A | 11/2000 | Riddle |
| 6,209,025 B1 | 3/2001 | Bellamy |

(Continued)

FOREIGN PATENT DOCUMENTS

| DE | 19971016486 | 9/1998 |
| DE | 10 2006 001 607 A1 | 8/2006 |

(Continued)

OTHER PUBLICATIONS

International Search Report from International Application No. PCT/EP2009/061398, Dated: Oct. 20, 2009.

(Continued)

*Primary Examiner* — Stella Woo
(74) *Attorney, Agent, or Firm* — Wolfe-SBMC (57) ABSTRACT

A method and corresponding system for communicating over a network using a first device and a peripheral device, wherein the first device comprises a user interface and a network interface for connecting to the network, and the peripheral device has a local connection to the first device, the local connection being independent of the network. The method comprises receiving data packets from the network at the network interface of the first device and forwarding the received data packets from the first device to the peripheral device via the local connection. A client engine of a communication client is executed on a processor of the peripheral device to process the received data packets. Processed data packets are sent from the peripheral device to the first device via the local connection such that data contained in the received data packets is conveyed to a user of the first device using the user interface of the first device.

27 Claims, 6 Drawing Sheets

U.S. PATENT DOCUMENTS

| | | |
|---|---|---|
| 6,243,129 B1 | 6/2001 | Deierling |
| 6,286,140 B1 | 9/2001 | Ivanyi |
| 6,628,964 B1 | 9/2003 | Bates et al. |
| 6,636,269 B1 | 10/2003 | Baldwin |
| 6,789,105 B2 | 9/2004 | Ludwig et al. |
| 6,930,661 B2 | 8/2005 | Uchida et al. |
| 7,058,901 B1 | 6/2006 | Hafey et al. |
| 7,099,693 B2 | 8/2006 | Shin |
| 7,184,049 B2 | 2/2007 | Ballin et al. |
| 7,454,711 B2 | 11/2008 | Angiulo et al. |
| 7,573,988 B2 | 8/2009 | Lee et al. |
| 7,587,684 B2 | 9/2009 | Perttula |
| 7,954,124 B2 | 5/2011 | Rambo |
| 7,966,039 B2 * | 6/2011 | Sadovsky et al. ............ 455/557 |
| 7,983,722 B2 | 7/2011 | Lowles et al. |
| 2001/0005197 A1 | 6/2001 | Mishra et al. |
| 2002/0109770 A1 | 8/2002 | Terada |
| 2002/0144259 A1 | 10/2002 | Gutta et al. |
| 2002/0199181 A1 | 12/2002 | Allen |
| 2003/0009768 A1 | 1/2003 | Moir |
| 2003/0036683 A1 | 2/2003 | Kehr et al. |
| 2003/0052648 A1 | 3/2003 | Hara et al. |
| 2003/0061033 A1 | 3/2003 | Dishert |
| 2003/0070177 A1 | 4/2003 | Kondo et al. |
| 2003/0070182 A1 | 4/2003 | Pierre et al. |
| 2003/0097661 A1 | 5/2003 | Li et al. |
| 2003/0105812 A1 | 6/2003 | Flowers, Jr. et al. |
| 2003/0117419 A1 | 6/2003 | Hermanson |
| 2003/0142802 A1 | 7/2003 | Hong et al. |
| 2004/0003025 A1 | 1/2004 | Hao |
| 2004/0049624 A1 | 3/2004 | Salmonsen |
| 2004/0060067 A1 | 3/2004 | Yi |
| 2004/0128700 A1 | 7/2004 | Pan |
| 2004/0135819 A1 | 7/2004 | Maa |
| 2004/0163127 A1 | 8/2004 | Karaoguz et al. |
| 2004/0176132 A1 | 9/2004 | Thrasher |
| 2004/0207723 A1 | 10/2004 | Davis et al. |
| 2004/0214541 A1 | 10/2004 | Choi |
| 2004/0258059 A1 | 12/2004 | Frank et al. |
| 2005/0071686 A1 | 3/2005 | Bagga et al. |
| 2005/0146598 A1 | 7/2005 | AbiEzzi et al. |
| 2005/0165922 A1 | 7/2005 | Hatano |
| 2005/0190700 A1 | 9/2005 | Melpignano |
| 2005/0249196 A1 | 11/2005 | Ansari et al. |
| 2005/0286711 A1 | 12/2005 | Lee et al. |
| 2005/0289480 A1 | 12/2005 | Mathews et al. |
| 2006/0040638 A1 | 2/2006 | McQuaide, Jr. |
| 2006/0080713 A1 | 4/2006 | Fujibayashi et al. |
| 2006/0095754 A1 | 5/2006 | Hyder et al. |
| 2006/0109268 A1 | 5/2006 | Napoli et al. |
| 2006/0181548 A1 | 8/2006 | Hafey et al. |
| 2006/0190443 A1 | 8/2006 | Mathews et al. |
| 2007/0039025 A1 | 2/2007 | Kraft et al. |
| 2007/0115346 A1 | 5/2007 | Kim et al. |
| 2007/0118866 A1 | 5/2007 | Chen |
| 2007/0139514 A1 | 6/2007 | Marley |
| 2007/0147367 A1 | 6/2007 | Hwang et al. |
| 2007/0156686 A1 | 7/2007 | Kim et al. |
| 2007/0214482 A1 | 9/2007 | Nguyen |
| 2007/0216759 A1 | 9/2007 | Gonen et al. |
| 2007/0275766 A1 | 11/2007 | Kim et al. |
| 2007/0279482 A1 | 12/2007 | Oswald et al. |
| 2008/0031169 A1 | 2/2008 | Shi et al. |
| 2008/0034325 A1 | 2/2008 | Ording |
| 2008/0062249 A1 | 3/2008 | Nagase et al. |
| 2008/0066131 A1 | 3/2008 | Chang et al. |
| 2008/0150892 A1 | 6/2008 | Duhig et al. |
| 2008/0152110 A1 | 6/2008 | Underwood et al. |
| 2008/0186410 A1 | 8/2008 | Hardacker et al. |
| 2009/0036159 A1 | 2/2009 | Chen |
| 2009/0167839 A1 | 7/2009 | Ottmar |
| 2009/0320073 A1 | 12/2009 | Reisman |
| 2010/0005497 A1 | 1/2010 | Maresca |
| 2010/0058408 A1 | 3/2010 | LaFreniere et al. |
| 2010/0060477 A1 | 3/2010 | Laasik et al. |
| 2010/0060715 A1 | 3/2010 | Laasik et al. |
| 2010/0060788 A1 | 3/2010 | Blackburn et al. |
| 2010/0064328 A1 | 3/2010 | Laasik et al. |
| 2010/0064329 A1 | 3/2010 | McLaughlin et al. |
| 2010/0064333 A1 | 3/2010 | Blackburn et al. |
| 2010/0064334 A1 | 3/2010 | Blackburn et al. |
| 2011/0043599 A1 * | 2/2011 | Luo et al. ................... 348/14.08 |
| 2011/0173672 A1 | 7/2011 | Angiolillo et al. |

FOREIGN PATENT DOCUMENTS

| | | |
|---|---|---|
| EP | 0741484 | 11/1996 |
| EP | 0919906 | 11/1998 |
| EP | 1331762 A1 | 7/2003 |
| EP | 1372333 | 12/2003 |
| EP | 1622378 | 2/2006 |
| EP | 1761048 | 3/2007 |
| EP | 1853013 A1 | 11/2007 |
| EP | 1860852 | 11/2007 |
| EP | 1912175 | 4/2008 |
| EP | 1940156 | 7/2008 |
| EP | 2110796 | 10/2009 |
| EP | 2353296 | 8/2011 |
| GB | 2410868 | 8/2005 |
| GB | 2463108 | 3/2010 |
| GB | 2463110 | 3/2010 |
| GB | 2463124 | 3/2010 |
| GB | 2463108 | 8/2012 |
| JP | 2001169368 | 6/2001 |
| JP | 2004080289 | 3/2004 |
| JP | 2004312320 | 11/2004 |
| JP | 2007067979 | 3/2007 |
| JP | 2008182463 | 8/2008 |
| WO | WO-9851079 | 12/1998 |
| WO | WO-0130070 | 4/2001 |
| WO | WO-0147210 | 6/2001 |
| WO | WO-0167315 | 9/2001 |
| WO | WO-0230105 | 4/2002 |
| WO | WO-0230116 | 4/2002 |
| WO | WO-02082343 | 10/2002 |
| WO | WO 03/021960 A1 | 3/2003 |
| WO | WO-03021960 | 3/2003 |
| WO | WO-03028373 | 4/2003 |
| WO | WO 2005/009019 A2 | 1/2005 |
| WO | WO-2005025194 | 3/2005 |
| WO | WO-2007098155 | 8/2007 |
| WO | WO-2007113580 | 10/2007 |
| WO | WO-2007127788 | 11/2007 |
| WO | WO-2008030711 | 3/2008 |
| WO | WO-2009094291 | 7/2009 |
| WO | WO-2010026185 | 3/2010 |
| WO | WO-2010026187 | 3/2010 |
| WO | WO-2010026190 | 3/2010 |
| WO | WO-2010026191 | 3/2010 |

OTHER PUBLICATIONS

Written Opinion of the International Search Authority from International Application No. PCT/EP2009/061398, Dated: Oct. 20, 2009.

"Advisory Action", U.S. Appl. No. 12/455,084, (Mar. 21, 2012), 3 pages.

"Advisory Action", U.S. Appl. No. 12/455,210, (Jun. 5, 2012), 2 pages.

"Advisory Action", U.S. Appl. No. 12/455,653, (Nov. 21, 2011), 3 pages.

"Final Office Action", U.S. Appl. No. 12/455,084, (Jan. 17, 2012), 16 pages.

"Final Office Action", U.S. Appl. No. 12/455,210, (Mar. 19, 2012), 14 pages.

"Final Office Action", U.S. Appl. No. 12/455,652, (May 16, 2012), 30 pages.

"Final Office Action", U.S. Appl. No. 12/455,653, (Sep. 14, 2011), 30 pages.

"Final Office Action", U.S. Appl. No. 12/584,463, (Feb. 24, 2012), 12 pages.

"Foreign Office Action", Great Britain Application No. 0907818.9, (Mar. 14, 2012), 4 pages.

"International Search Report and Written Opinion", Application No. PCT/EP2009/061413, (Apr. 12, 2009), 13 pages.

"International Search Report and Written Opinion", Application No. PCT/EP2009/061418, (Apr. 12, 2009), 13 pages.

"International Search Report and Written Opinion", Application No. PCT/EP2009/061410, (Oct. 20, 2009), 14 pages.

"International Search Report and Written Opinion", International Application No. PCT/EP2009/061409, (Oct. 20, 2009), 15 pages.

"International Search Report and Written Opinion", International Application No. PCT/EP2009/061411, (Nov. 26, 2009), 20 pages.

"International Search Report and Written Opinion", International Application No. PCT/EP2009/061416, (Oct. 21, 2009), 13 pages.

"International Search Report", Application No. PCT/EP2009/061406, (Dec. 4, 2009), 3 pages.

"Non Final Office Action", U.S. Appl. No. 12/455,653, (Mar. 23, 2011), 22 pages.

"Non-Final Office Action", U.S. Appl. No. 12/455,084, (May 23, 2011), 14 pages.

"Non-Final Office Action", U.S. Appl. No. 12/455,085, (Mar. 15, 2012), 6 pages.

"Non-Final Office Action", U.S. Appl. No. 12/455,210, (Sep. 29, 2011), 14 pages.

"Non-Final Office Action", U.S. Appl. No. 12/455,652, (Jan. 26, 2012), 28 pages.

"Non-Final Office Action", U.S. Appl. No. 12/584,463, (Oct. 13, 2011), 10 pages.

"Search Report under Section 17", Application No. GB0816276.0, (Nov. 27, 2009), 2 pages.

"Search Report under Section 17", Application No. GB0816271.1, (Nov. 24, 2009), 2 pages.

"Search Report under Section 17", Application No. GB0816275.2, (Nov. 23, 2009), 1 page.

"Search Report under Section 17", Application No. GB0816279.4, (Nov. 26, 2009), 2 pages.

"Search Report", Application No. GB0816278.6, (Dec. 2, 2009), 2 pages.

"Search Report", Application No. GB0816280.2, (Dec. 3, 2009), 1 page.

"Search Report", Application No. GB0816281.0, (Nov. 20, 2009), 2 pages.

"Written Opinion of the International Searching Authority", Application No. PCT/EP2009/061406, (Dec. 4, 2009), 5 pages.

International Search Report dated Aug. 24, 2009, issued in UK Intellectual Property Office for Application No. GB0907818.9 (1 page).

"Advisory Action", U.S. Appl. No. 12/455,652, (Aug. 30, 2012), 3 pages.

"Advisory Action", U.S. Appl. No. 12/584,463, (May 17, 2012), 3 pages.

"Final Office Action", U.S. Appl. No. 12/455,085, (Aug. 16, 2012), 7 pages.

"Foreign Office Action", Great Britain Application No. 0816279.4, (Mar. 8, 2012), 5 pages.

"Non-Final Office Action", U.S. Appl. No. 12/455,084, (Aug. 30, 2012), 29 pages.

"Non-Final Office Action", U.S. Appl. No. 12/455,635, (Aug. 22, 2012), 20 pages.

"Non-Final Office Action", U.S. Appl. No. 12/455,653, (Oct. 23, 2012), 28 pages.

"Non-Final Office Action", U.S. Appl. No. 12/584,463, (Aug. 3, 2012), 11 pages.

"Notice of Allowance", U.S. Appl. No. 12/455,210, (Oct. 10, 2012), 4 pages.

"Advisory Action", U.S. Appl. No. 12/455,085, (Nov. 7, 2012), 3 pages.

"Corrected Notice of Allowance", U.S. Appl. No. 12/455,210, (Dec. 5, 2012), 2 pages.

"Final Office Action", U.S. Appl. No. 12/455,635, (12/31/12), 25 pages.

"Notice of Allowance", U.S. Appl. No. 12/584,463, (Nov. 16, 2012), 7 pages.

"Notice of Allowance", U.S. Appl. No. 12/455,084, (Feb. 11, 2013), 4 Pages.

* cited by examiner

PERIPHERAL DEVICE FOR COMMUNICATION OVER A COMMUNICATIONS SYSTEM

RELATED APPLICATION

This application claims priority under 35 U.S.C. §119 or 365 to Great Britain, Application No. 0907818.9, filed May 6, 2009, Great Britain Application No. 0816271.1, filed Sep. 5, 2008, Great Britain Application No. 0816276.0, filed Sep. 5, 2008, Great Britain Application No. 0816275.2, filed Sep. 5, 2008, Great Britain Application No. 0816278.6, filed Sep. 5, 2008, Great Britain Application No. 0816279.4, filed Sep. 5, 2008, Great Britain Application No. 0816280.2, filed Sep. 5, 2008, and Great Britain Application No. 0816281.0, filed Sep. 5, 2008. The entire teachings of the above applications are incorporated herein by reference.

TECHNICAL FIELD

This invention relates to a peripheral device for communication in a communications system.

BACKGROUND

Packet-based communication systems allow the user of a device, such as a personal computer (PC), to communicate across a computer network such as the Internet. Packet-based communication systems include voice over interne protocol ("VoIP") communication systems. These systems are beneficial to the user as they are often of significantly lower cost than fixed line or mobile networks. This may particularly be the case for long-distance communication. Typically, to use a VoIP system, the user installs and executes client software on their device. The client software provides the VoIP connections as well as other functions such as registration and authentication. In addition to voice communication, the client may also provide further features such as video calling, instant messaging ("IM"), voicemail and file transfer.

One type of packet-based communication system uses a peer-to-peer ("P2P") topology built on proprietary protocols. To enable access to a peer-to-peer system, the user must execute P2P client software provided by a P2P software provider on their computer, and register with the P2P system. When the user registers with the P2P system the client software is provided with a digital certificate from a server. Once the client software has been provided with the certificate, communication can subsequently be set up and routed between users of the P2P system without the further use of a server. In particular, the users can establish their own communication routes through the P2P system based on the exchange of one or more digital certificates (or user identity certificates, "UIC"), which enable access to the P2P system. The exchange of the digital certificates between users provides proof of the users' identities and that they are suitably authorised and authenticated in the P2P system. Therefore, the presentation of digital certificates provides trust in the identity of the user. It is therefore a characteristic of peer-to-peer communication that the communication is not routed using a server but directly from end-user to end-user. Further details on such a P2P system are disclosed in WO 2005/009019.

A user's device may include input means such as a microphone and/or a camera to capture data (such as audio and/or video data) from the user, and output means such as a speaker and/or a display to convey data to the user (such as audio and/or video data). The user's device typically also includes the communication client software which is executed on a processor of the device, and means for connecting to the communication system, such as a network interface. In this way the user's device typically includes all of the components necessary to communicate over the network.

However some user devices, typically corporately owned PCs, have firewall software executed on the processor of the device, or on the gateway of a Local Area Network (LAN) to block the user from downloading certain types of software onto the device. In this case the user may be prevented from installing the communication client software on his or her device and is therefore prevented from connecting to the communication system.

In some cases a user may purchase a device with the communication client preinstalled on the processor of the device and it may not be possible to download updated versions of the communication client. Since the user's device typically includes all of the components necessary to communicate over the network, if it is desired to replace one component with a new or upgraded version of the component then it is necessary to replace the whole device including all of the other components. Furthermore, the quality of each individual component in the device is often lower than the quality of corresponding components in devices that are dedicated to performing the function of the component in question. For example the display and speakers of the user's device may be of lower quality than the display and speakers of a device whose primary purpose is to display pictures and to play sounds to a user, such as a television.

Furthermore, there are currently many different methods for communicating between users, for example phone calls, emails, etc. The cost of the user's device including all of the components necessary to communicate over the P2P system may be relatively high, when compared to other devices which may be used for communicating in different ways. In some cases the increased cost of the user's device may put off some users from purchasing the device, as they may be content to use other forms of communication that are available. A reduction in new users to the P2P communication system may detract from the popularity of the P2P communication system, which in turn may reduce the desirability of the P2P communication system for existing users of the P2P system.

Updated versions of the communication client may be released from time to time. Due to the relatively high cost of the user's device and the need to replace all of the components necessary to communicate over the P2P system, the user may decide not to update his communication client every time an updated version is released. It is desirable for the users of the communication system to have the most up to date version of the communication client as this will give the users the benefit of the latest advances and should provide greater user satisfaction.

It is an aim of the present invention to address the problems with the prior art described above.

SUMMARY

In a first aspect of the invention there is provided a method of communicating over a network using a first device and a peripheral device, the first device comprising a user interface and a network interface for connecting to the network, the peripheral device having a local connection to the first device, the local connection being independent of the network, the method comprising: receiving data packets from the network at the network interface of the first device; forwarding the received data packets from the first device to the peripheral device via the local connection; executing a client engine of a communication client on a processor of the peripheral device to process the received data packets; and sending processed data packets from the peripheral device to the first device via the local connection such that data contained in the received data packets is conveyed to a user of the first device using the user interface of the first device.

In a second aspect of the invention there is provided a system for communicating over a network comprising: a first device having a local connection to a peripheral device, the local connection being independent of the network, the first device comprising: user interface means; network interface means for connecting to the network and for receiving data packets from the network; means for forwarding the received data packets from the first device to the peripheral device via the local connection; and means for receiving processed data packets from the peripheral device via the local connection such that data contained in the received data packets is conveyed to a user of the first device using the user interface means; and the peripheral device comprising: means for receiving the received data packets from the first device via the local connection; processing means for executing a client engine of a communication client to process the received data packets; and means for sending processed data packets to the first device via the local connection.

In a third aspect of the invention there is provided a peripheral device for communicating over a network, the peripheral device comprising: means for receiving data packets from a first device via a local connection that is independent of the network, the data packets originating from the network; processing means for executing a client engine of a communication client to process the received data packets; and means for sending processed data packets to the first device via the local connection, the processed data packets being for conveying data contained in the received data packets to a user of the first device.

In a fourth aspect of the invention there is provided a method of communicating over a network using a first device and a peripheral device, the first device comprising a user interface and a network interface for connecting to the network, the peripheral device having a local connection to the first device that is independent of the network, the method comprising: receiving data at the peripheral device; encoding the received data at the peripheral device; executing a client engine of a communication client on a processor of the peripheral device to process the received data packets; sending the processed data packets from the peripheral device to the first device via the local connection; and forwarding the received data packets from the first device to the communication network via the network interface.

In a fifth aspect of the invention there is provided a method of establishing a bidirectional communication over a network using a first device and a peripheral device, the first device comprising a user interface, the peripheral device comprising a network interface for connecting to the network and a local connection to the first device that is independent of the network, the method comprising: receiving data packets from the network at the network interface of the peripheral device; executing a client engine of a communication client on a processor of the peripheral device to process the received data packets; sending processed data packets from the peripheral device to the first device via the local connection; and decoding the data at the first device such that data contained in the received data packets is conveyed to a user of the first device using the user interface of the first device; and wherein the method further comprises: receiving data at the peripheral device; encoding the received data at the peripheral device; executing a client engine of a communication client on a processor of the peripheral device to process the received data packets; sending the processed data packets from the peripheral device to the first device via the local connection; and forwarding the received data packets from the first device to the communication network via the network interface.

In a sixth aspect of the invention there if provided a system for communicating over a network comprising: a first device having a local connection to a peripheral device, the local connection being independent of the network, the peripheral device comprising: network interface means for connecting to the network and for receiving data packets from the network; processing means for executing a client engine of a communication client to process the received data packets; and means for sending processed data packets to the first device via the local connection, the first device comprising: means for receiving the processed data packets from the peripheral device; means for decoding the processed data packets; and user interface means for conveying data contained in the processed data packets to a user of the first device.

BRIEF DESCRIPTION OF THE DRAWINGS

For a better understanding of the present invention and to show how the same may be put into effect, reference will now be made, by way of example, to the following drawings in which.

DETAILED DESCRIPTION

Figure 1:
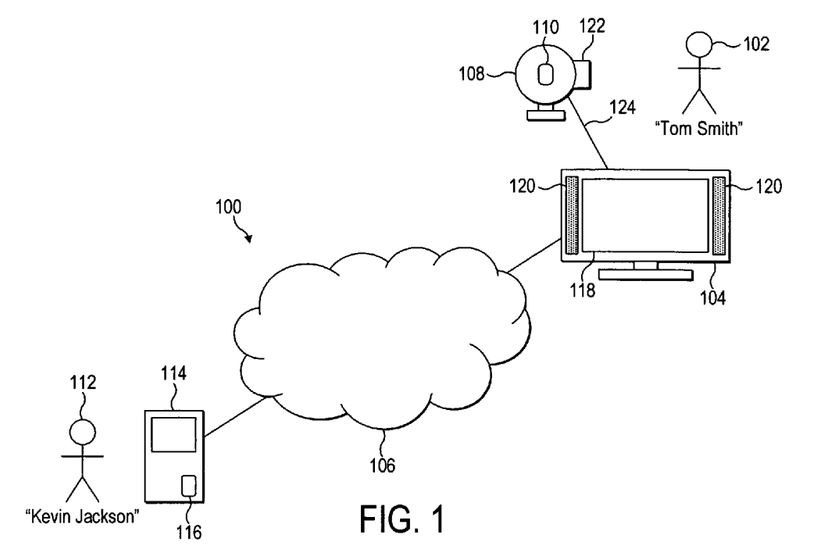
FIG. 1 shows a packet-based communication system.

Reference is first made to FIG. 1, which illustrates a packet-based communication system 100 according to an embodiment of the present invention. Note that whilst this illustrative embodiment is described with reference to a P2P communication system, other types of communication system could also be used, such as non-P2P, VoIP or IM systems which employ client software for communication. A first user of the communication system (named "Tom Smith" 102 in FIG. 1) is associated with a device 104, which is shown connected to a network 106. Note that the communication system 100 utilises a network such as the Internet. In the preferred embodiment shown in FIG. 1 the device 104 is a television. However, in alternative embodiments the device 104 may be, for example, a mobile phone, a personal digital assistant ("PDA"), a personal computer ("PC") (including, for example, Windows™, Mac OS™ and Linux™ PCs), a gaming device or other embedded device able to connect to the network 106. The television 104 has a user interface which is capable of outputting information to a user 102 of the device through for example a display 118 and speakers 120. A peripheral device 108 is connected to the television 104 using a local connection 124, which may be a wired connection such as a Universal Serial Bus (USB) connection using USB protocol, or may alternatively be a wireless connection such as a Bluetooth connection. The connection 124 is "local" in the sense that it is not a network connection using the network 106. Indeed the local connection 124 is separate from the network 106. In other words the local connection 124 is independent of the network 106. In fact, the peripheral device 108 might not have a direct connection to the network 106. If the peripheral device 108 does have a direct connection to the network 106, it does not use the direct connection for communication with the main device 104.

Note that in alternative embodiments, the television 104 can connect to the communication network 106 via additional intermediate networks not shown in FIG. 1. For example, if the device 104 is a mobile device, then it can connect to the communication network 106 via a cellular mobile network (for example a GSM or UMTS network).

Typically the television 104 and the peripheral device 108 are used within the vicinity of the user 102, such that data can be conveyed to the user 102 through the television 104, and data can be captured from the user 102 by the peripheral device 108 using for example a camera 122 to capture image or video data and a microphone to capture audio data. The peripheral device 108 has a communication client 110 embedded within it which is provided by the software provider. The communication client 110 is a software program executed on a processor in the peripheral device 108. The peripheral device executes a client engine of the communication client 110 in order to communicate with other users of the network (such as the user 112 called "Kevin Jackson" in FIG. 1).

In the preferred embodiment shown in FIG. 1 the peripheral device 108 is a web camera (webcam). However, in alternative embodiments the peripheral device may be an alternative data capture device such as a microphone, or a processor dedicated to running the client engine of the communication client. A client user interface 212 installed on the television is configured to provide an interface for the user 102 to receive information from, and to provide information to the client engine. The webcam 108 can connect to the network 106 via the television 104. Therefore the webcam 108 does not require a separate, direct connection to the network 106.

Figure 2A:
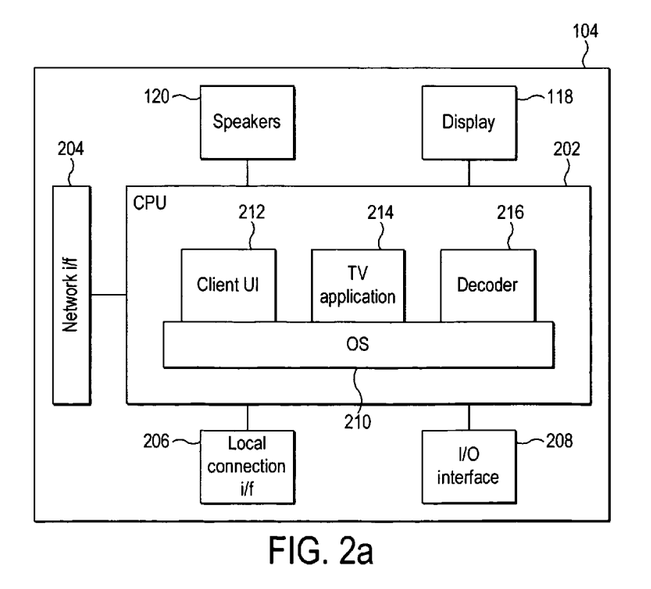
FIG. 2a shows a television of a first embodiment.

FIG. 2a illustrates a detailed view of the television 104. The television 104 comprises a central processing unit ("CPU") 202, to which is connected a display 118 such as a screen, and speakers 120. The display 118 and the speakers 120 are integrated into the television 104. In alternative devices 104 at least one of the display 118 and the speakers 120 may not be integrated into the device 104 and may be connected to the CPU 202 via respective interfaces (e.g. a USB interface). A remote controller may be connected to the CPU 202 via an interface (not shown). The CPU 202 is connected to a network interface 204 such as a modem for communication with the network 106. The CPU 202 is connected to a local connection interface, such as a USB interface or a Bluetooth interface 206 for communication with the peripheral device 108. The CPU 202 may be connected to various other input or output devices through the I/O interface 208. The network interface 204, local connection interface 206 and I/O interface 208 may be integrated into the device 104 as shown in FIG. 2a. In alternative devices 104 at least one of the network interface 204, local connection interface 206 and I/O interface 208 are not integrated into the device 104.

FIG. 2a also illustrates an operating system ("OS") 210 executed on the CPU 202. Running on top of the OS 210 is a client user interface 212 for the communication client 110. The operating system 210 manages the hardware resources of the television and handles data being transmitted to and from the network via the network interface 204. Also running on top of the OS 210 is a television application 214 which is used to allow the device 104 to operate as a conventional television. Also running on top of the OS 210 is a decoder 216. The decoder 216 is used to decode broadcast television video data. The decoder 216 may also be used to decode encoded video data received from the client engine 312 as described in more detail below.

Figure 3:
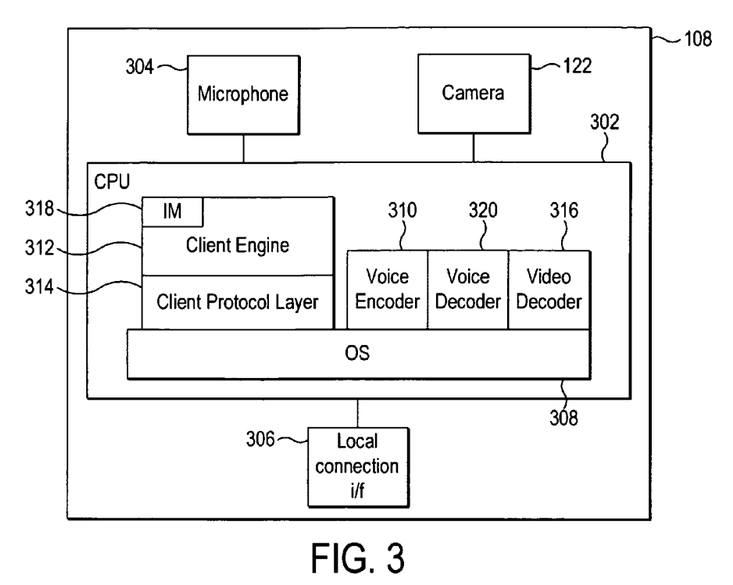
FIG. 3 shows a webcam of a preferred embodiment.

FIG. 3 illustrates a detailed view of the webcam 108. The webcam 108 comprises a central processing unit ("CPU") 302, to which is connected input means such as a camera 122 and a microphone 304 for capturing data from the user. The camera 122 and the microphone 304 are integrated into the webcam 108. The CPU 302 is connected to a local connection interface, such as a USB interface or a Bluetooth interface 306 for communication with the device 104. The local connection interface 306 may be integrated into the webcam 108 as shown in FIG. 3. In alternative peripheral devices 108 one or more of the camera 122, microphone 304 and local connection interface 306 are not integrated into the peripheral device 108.

FIG. 3 also illustrates an operating system ("OS") 308 executed on the CPU 302. Running on top of the OS 308 is a client engine 312 and a client protocol layer 314 for the communication client 110. The client protocol layer 314 of the client software communicates with the operating system 308 and manages the connections over the P2P communication system. Processes requiring higher level processing are passed to the client engine layer 312. The client engine 312 may be arranged to control the client user interface layer 212 of the device 104 to present information to the user. The client user interface layer 212 of the device 104 is used to interact with the user 102. For example, the user will interact with the client user interface 212 to initiate and answer calls. Instructions are transmitted between the client user interface layer 212 of the device 104 and the client engine layer 312 of the peripheral device 108 over the local connection 124 to allow the user to interact with the client 110. For example, when a call request is received at the client engine 312 of the peripheral device 108 via the network interface 204 of the device 104 from another user (e.g. "Kevin Jackson" 112) of the network 106 requesting that a call is established with the user 102, the client engine 312 sends an instruction over the local connection 124 to the client user interface 212 of the device 108 to instruct the client user interface 212 to ask the user 102 whether to accept the call. The user 102 can input a response to the client user interface 212 to either accept or reject the call. The response is sent to the client engine 312 over the local connection 124 and the client engine 312 will either accept or reject the incoming call accordingly. In a similar way, if the user 102 would like to initiate a call with another user of the network 106 (for example user 112) then the user 102 can input a call request to the client user interface 212 at the device 104. The call request is transmitted to the client engine 312 of the peripheral device 108 over the local connection 124. The client engine 312 can then send the call request to a device 114 of the user 112 over the network 106 via the local connection 124 and the network interface 204 of the device 104 to set up the call.

The operating system 308 manages the hardware resources of the peripheral device 108 and handles data being transmitted to and from the device 104 via the local connection interface 306. Also running on top of the OS 308 is a voice encoder 310, a voice decoder 320 and a video encoder 316. The encoders 310 and 316 may be used to encode data as described in more detail below.

Figure 4:
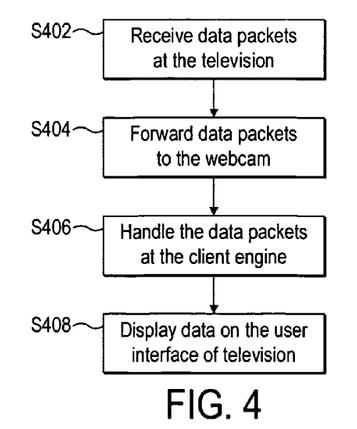
FIG. 4 shows a flowchart of a process for receiving and displaying data.

With reference to FIG. 4, there is now described the operation of the communication system 100 in a preferred embodiment. The users 102 ("Tom Smith") and 112 ("Kevin Jackson") are users of the P2P communication system. The user 112 ("Kevin Jackson") may want to send data, such as audio and video data, to the user 102 ("Tom Smith") through the network 106. As described above, to initiate a call, a call set up request message is transmitted from a communication client 116 of device 114 operated by user 112 to the client engine 312 of device 104. The client engine 312 instructs the client user interface 212 to display an incoming call notification to the user 102 at device 104. The user 102 can accept the call by interacting with the client user interface 212. If the user accepts the call a call accept message is transmitted from the client engine to the device 114.

When a call accept message is received at the communication client 116 from the client engine 312, data packets are transmitted from the communication client 116 to the television 104 via the network 106. At step S402 the data packets are received at the television 104. The data packets are received via the network interface 204 of the television 104. The received data packets are routed to the local connection interface 206 of the television 104. In step S404 the received data packets are forwarded to the webcam 108 over the local connection 124. The data packets are received at the local connection interface 306 of the webcam 108. The data packets are routed to the CPU 302 of the webcam 108. At step S406 the client engine 312 is executed on the CPU 302 of the webcam 108 in order to handle the data packets in accordance with protocols of the P2P communication system. The received data packets may contain for example textual, image, video and/or audio data. The client engine 312 decrypts the data in the data packets, identifies the type of data retrieved from the data packets and provides the data to the appropriate module. For example, encoded video data is provided to the video decoder 216, encoded audio data is provided to the audio decoder 320 and textual data is provided to the IM (instant messaging module) 318.

If the data contained in the data packets is intended to be conveyed to the user 102 then at step S408 the data is sent from the webcam 108 to the television 104 using the local connection 124 via the local connection interface 306 of the webcam 108 and the local connection interface 206 of the television 104.

In a preferred embodiment of the invention encoded video data received from the client engine is decoded by the video decoder 216 located in the television, as shown in FIG. 2. In this case encoded video data is sent via the local connection from the client engine to the video decoder 216 of the television CPU 202 for decoding, thus minimising the bandwidth requirements of the local connection. The decoded video data may be conveyed to the user 102 using the client user interface 212 of the television 104 through the display 118.

In one embodiment of the invention, encoded audio data received from the client engine is decoded by the voice decoder 320 located in the webcam. Since audio data transmitted from the television is also encoded in the webcam, acoustic echo cancellation may be applied to the transmitted audio data based on the decoded received audio data.

The method described above allows data received from the network 106 to be conveyed to the user 102.

Figure 5:
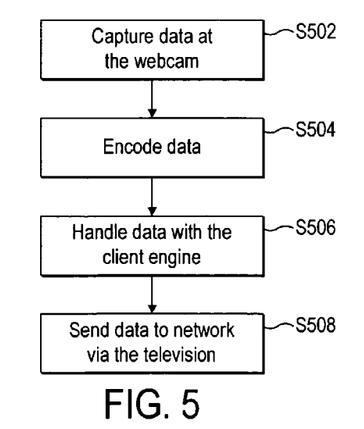
FIG. 5 shows a flowchart of a process for capturing and sending data.

During a communication event, such as a video call, data may be sent from the user 102 ("Tom Smith") to the user 112 ("Kevin Jackson"). With reference to FIG. 5 a method of capturing data from the user 102 is described. In step S502 data is captured from the user 102 at the webcam 108. The captured data may be video or image data captured using the camera 122 of the webcam 108. The captured data may be audio data captured using the microphone 304. In other embodiments the peripheral device 108 may allow textual data to be captured from the user 102 using for example a keypad of the peripheral device 108.

In step S504 the captured voice data and video data are encoded by the voice encoder 310 and the video encoder 316 respectively. Encoded data packets are output from the voice and video encoders. In step S506 the client engine 312 running on the operating system 302 of the webcam 108 handles the encoded data packets according to the requirements and protocols of the P2P communication system on which the data will be transmitted.

As described above, in preferred embodiments, the webcam 108 is not directly connected to the network 106. In step S508 the captured data packets are sent to the television 104 using the local connection 124 which is distinct from the network 106, and then the data packets are forwarded from the television 104 to the network using the network interface 204 of the television 104. In this way, the webcam 108 is configured to use the network interface 204 of the television to send data captured from the user 102 to the network 106.

As described above, in a preferred embodiment of the invention, the webcam 108 includes the video encoder 316 and the television 104 includes the video decoder 216. Therefore video data sent between the webcam 108 and the television 104 on the local connection 124 is always encoded. User interface instructions are sent from the television CPU 202 to the webcam 108 via the local connection 124. User interface notifications are sent from the client engine 312 of the webcam 108 to the user interface 212 of the television via the local connection 124.

In one embodiment of the invention, driver software is stored on the peripheral device. When the peripheral device is first connected to the television, the operating system 202 of the television 104 retrieves a driver suitable for the operating system from the peripheral device 108 and sets up the network configuration.

In one embodiment of the invention the client user interface 212 may be stored on the peripheral device together with the driver software. The operating system of the device 104 may be arranged to retrieve the client user interface 212 together with the driver when the peripheral device is attached.

In a further embodiment of the invention a client user interface API (Application Programming Interface) 213 may be stored on the peripheral device. The operating system of the device 104 may be arranged to retrieve the client user interface API 213 together with the driver when the peripheral device is attached. The client user interface API 213 provides an interface between the client engine 312 and a user interface 212'. In one exemplary embodiment the client user interface 212 may be preinstalled on the device and form part of the user interface of the television application 214.

Figure 2B:
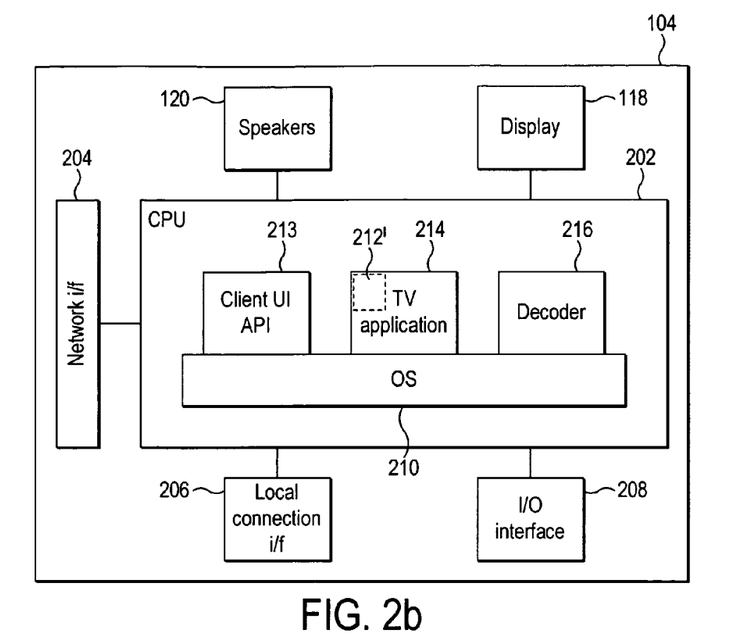
FIG. 2b shows a television of another embodiment.

As shown in FIG. 2b the client user interface API 213 is executed on the CPU of the device 104 and is arranged to provide an interface between a user interface 212' of the television application 214 and the client engine 312. The client user interface API is arranged to recognise inputs from the user interface 212' of the television application 214 and to control the client engine accordingly, for example a notification that the red button of a remote control is pressed may be provided to the client user interface API 213. The client user interface API 213 may be arranged to interpret this notification as a request for the contact list to be displayed. In response, the client user interface API may instruct the client engine to provide the contact list via the local connection to the client user interface API 213. In response to receiving the contact list at the client user interface API 213, the client user interface API is arranged to provide a text list of the user's contact list that can be interpreted by the user interface 212' of the television application 214. The user may then scroll up and down the list to select a contact that the user wishes to call using the controls of the remote control. Actuation of another function button of the remote control, for example the blue button, may be interpreted by the client user interface API that the user wishes to place a call to the selected contact.

Figure 9:
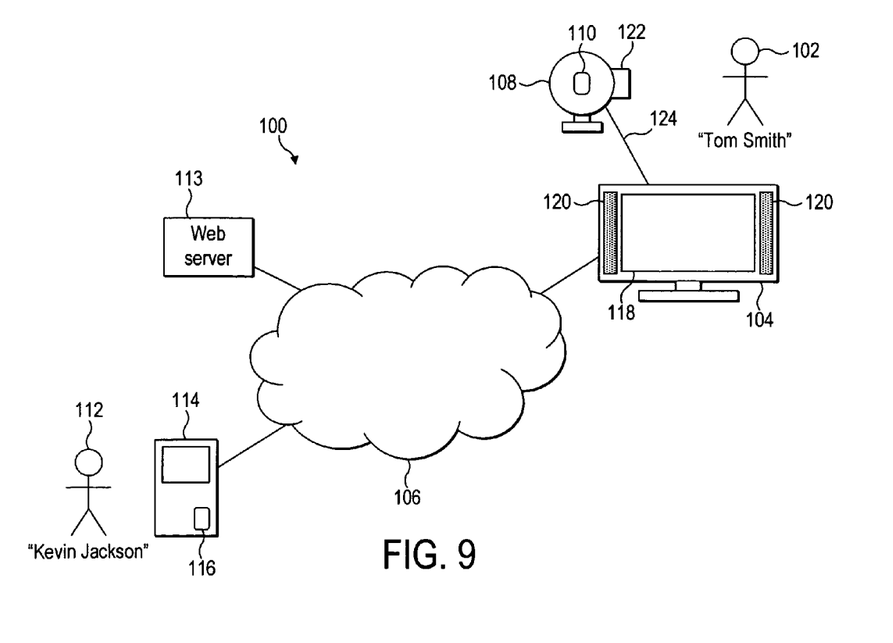
FIG. 9 shows a packet-based communication system according to a further embodiment.

In a further exemplary embodiment of the invention the client user interface 212' may be provided by a webpage. This embodiment will now be described with reference to FIG. 2c and FIG. 9.

Figure 2C:
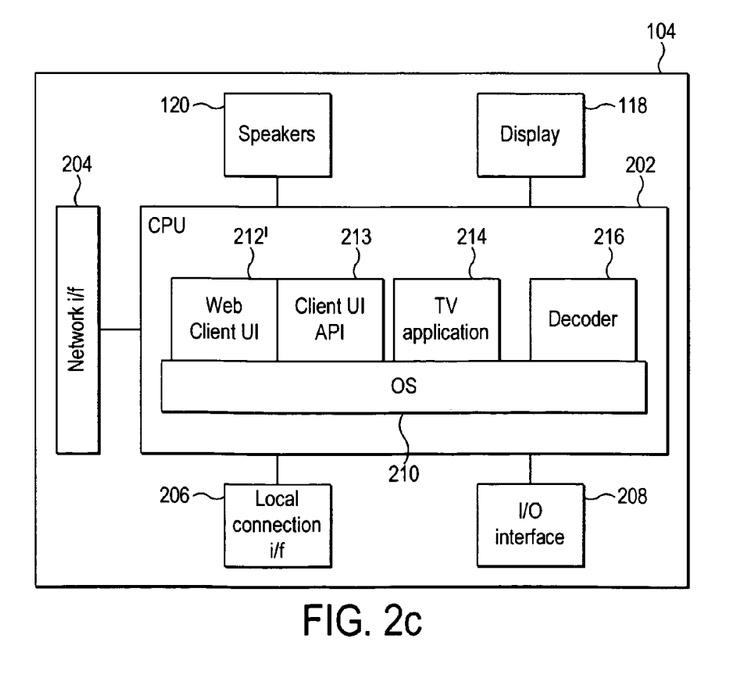
FIG. 2c shows a television of a further embodiment.

When the peripheral device 108 is connected to the device 104, the operating system of the user device 104 is arranged to retrieve driver software for the peripheral device 108 from the memory of the peripheral device 108. The client user interface API 213 is provided together with the driver software to the device 104. As shown in FIG. 2c the client user interface API 213 is executed on the CPU of the device. The client user interface API is arranged to access the web server 113 shown in FIG. 9 via the network interface 204. The client user interface API is further arranged to download a user interface application 212' from the web server 113. The user interface application may be a java programme which may be downloaded to the CPU of the device without being blocked by firewalls on the device 104. The user interface 212' may be displayed on the display 118 of the device 104 and used to communicate with the client engine via the client user interface API.

Executing the client engine 312 on a peripheral device (such as the webcam 108) attached to a device (such as the television 104) has several advantages over a system in which the client engine is executed on the device 104 itself. Executing the client engine 312 on the peripheral device 108 means that it is not necessary to install a client engine in the processor of the device 104. Indeed, in preferred embodiments there is not a communication client installed on the television 104. The user 102 can use the communication client simply by connecting the peripheral device 108 to the device 104.

Therefore if the user is prevented from downloading communication client software on the device due to firewall restrictions, the user may nevertheless use the device to communicate via the communication system by connecting the device to the peripheral device. Furthermore instead of having to purchase a new television 104 with the desired communication client preinstalled the user may connect the peripheral device to communicate via the communication system using the user interface of the device. Additionally, updated versions of the communication client engine may be used without having to purchase a new television 104. Users are likely to already have televisions, with the primary use being for watching (and listening to) television programs. The quality of the display and the speakers of existing televisions is high (when compared to the display and speakers of a device which is to be used primarily as a communication device). The user may therefore prefer to use the display and speakers of the television to convey data that is received from the network 106.

Furthermore, existing televisions are often capable of connecting to the network 106 through a network interface (e.g. network interface 204). Therefore a user who owns a television (such as television 104) already has in his possession some of the components necessary to communicate over the P2P system (e.g. a display, speakers, a network interface).

The peripheral device 108 of the present invention provides the remaining components necessary to communicate over the P2P system (e.g. the webcam 108 provides the client engine 312 to handle received data packets from the P2P system, and means for capturing data from the user such as a camera 122 and a microphone 304). Since the user is likely to already own a television 104, it is advantageous to provide only the remaining components necessary for using the P2P communication system in a peripheral device that can connect to the television. The present invention exploits that fact users often own devices (such televisions) which can connect to the network through a network interface. The peripheral device 108 includes the client engine 312 of a client for communicating over a P2P system. The peripheral device does not need its own network interface for connecting to the network 106 because it can use the existing network interface 204 of the device 104. The peripheral device 108 therefore requires only a local connection interface 306 for connecting with the device 104.

The cost of the webcam 108 is likely to be lower than a dedicated device that includes all of the components necessary to communicate over the P2P system. A lower cost gives users more incentive to purchase the webcam 108 and they are also more likely to purchase the latest updates of the communication client engine, as they are not required to purchase a whole new television. It is beneficial to user satisfaction for the users to be using the most up to date versions of the client software. Another aspect of the webcam that can reduce its cost is that it does not require a separate network interface for connecting to the network 106. The webcam 108 can connect to the television using the local connection 124 (e.g. a USB connection) such that it can use the network interface 204 of the television 104 to connect to the network 106.

The webcam 108 may be built into the casing of the television 104 to make the system compact. It may still be simple to replace the webcam with an updated version by removing the webcam from the casing of the television 104. Alternatively, the webcam 108 may be physically separate from the television.

User data, such as chat history, may be stored on the webcam 108. When the webcam 108 is detachable from the television 104 the privacy of the user data may be improved as the user is able to remove the webcam, storing the user data.

Figure 6:
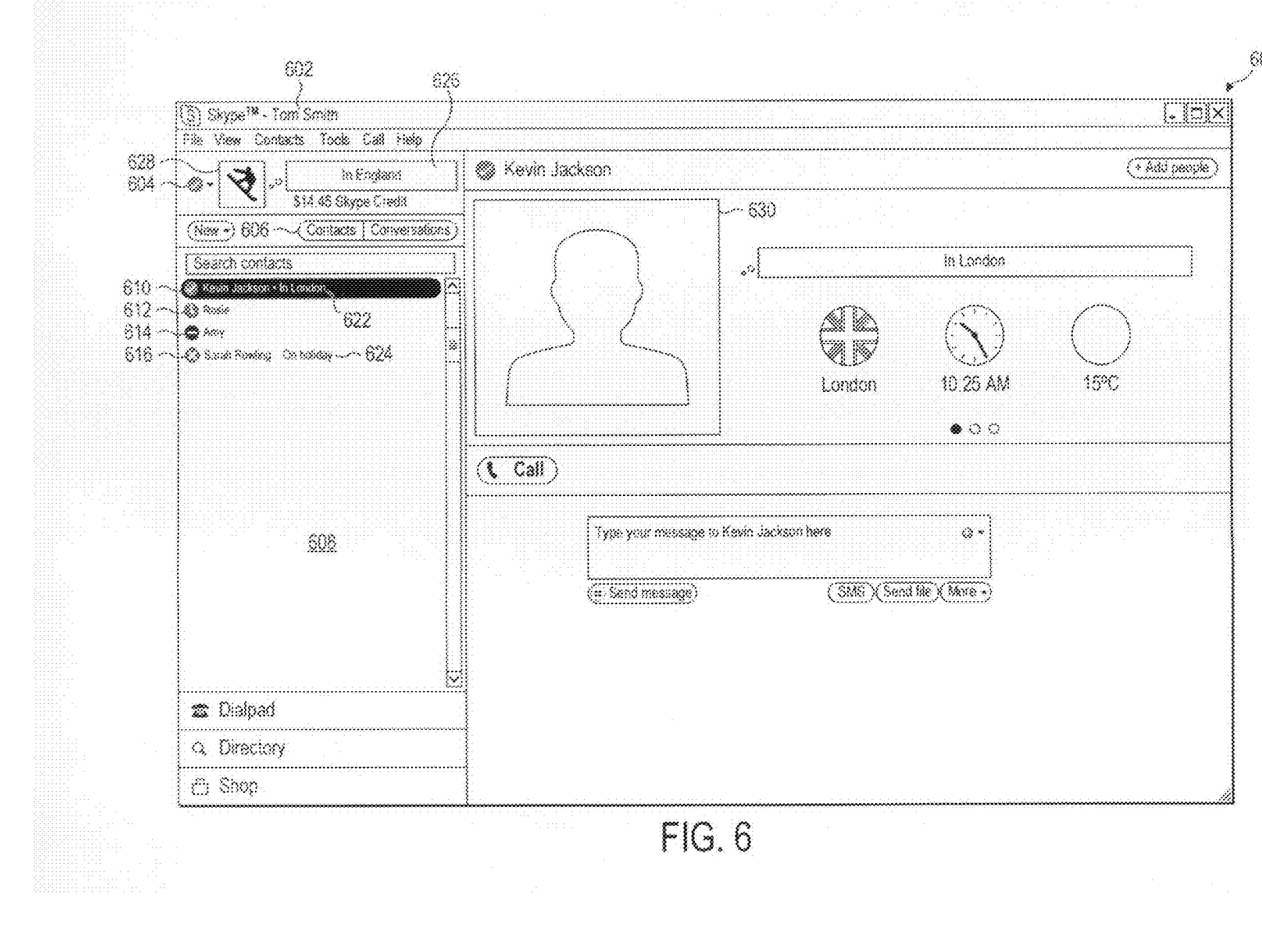
FIG. 6 shows a user interface of a communication client.

FIG. 6 shows an embodiment of the client user interface 212. Note that the user interface 600 can be different depending on the type of device 104. For example, the user interface can be smaller or display information differently on a mobile device, due to the small screen size. In the example of FIG. 6, the client user interface 600 displays the username 602 of "Tom Smith" 102 in the communication system, and the user can set his own presence state (that will be seen by other users) using a drop down list by selecting icon 604.

The client user interface 600 comprises a button 606 labelled "contacts", and when this button is selected the contacts stored by the user in a contact list are displayed in a pane below the button 606. In the example user interface in FIG. 6, four contacts of other users of the communication system are shown listed in contact list 608. Each of these contacts have authorised the user 102 of the client 110 to view their contact details and presence state. Each contact in the contact list 608 has a presence status icon associated with it. For example, the presence status icon for "Kevin Jackson" 610 indicates that this contact is "online", the presence icon for "Rosie" 612 indicates that this contact is "away", the presence icon for "Amy" 614 indicates that this contact's state is "do not disturb" ("DND"), the presence icon for "Sarah Rowling" 616 indicates that this contact is "offline". Further presence state indications can also be included.

Presence information in packet-based communication systems can additionally be supplemented by "mood messages". Mood messages are traditionally short text strings that are composed by the users to distribute information about themselves to their contacts to supplement their presence status. The mood message of a contact is generally displayed next to the contact's name in the list of contacts 608. The presence status of the contact is displayed with the mood message next to the name of the contact in the list of contacts 608. In FIG. 6, the mood messages 622 and 624 of the contacts are shown displayed next to the names of the contacts in the contact list 608.

The user 102 may also select a picture 628 to represent the user (known as an avatar). The client 110 periodically requests the presence state information for each of the contacts in the contact list 608 directly over the communication system. Similarly, the current mood message (e.g. "in London" 622 for "Kevin Jackson") for each of the contacts, as well as a picture (avatar—e.g. picture 630 for "Kevin Jackson") that has been chosen to represent the contact, are also retrieved by the client 110 directly from the respective clients of each of the contacts over the communication system. The presence states and mood messages of the contacts are therefore determined using a "pull" technique, as the data is requested from the clients of each of the contacts. In alternative embodiments, the presence state, mood message and avatar of a user can be "pushed" to each of the user's contacts over the communication network, either periodically or whenever the presence state is changed.

A further advantage of the present invention is that the CPU resources of the processor 202 of the television 104 are not required to maintain presence states, avatar or mood message changes of contacts in the contact list 608. Changes to the presence states, avatar or mood messages of the contacts in the contact list 608 are maintained by the client engine 312 of the webcam 108 and it is only necessary to provide these changes to the user interface 212 of the television 104 when the user 102 chooses to view the contact list 608 on the television 104. This reduces the processing resources of the television 104 that are used, as compared to executing the entire communication client on the television 104.

Figure 7:
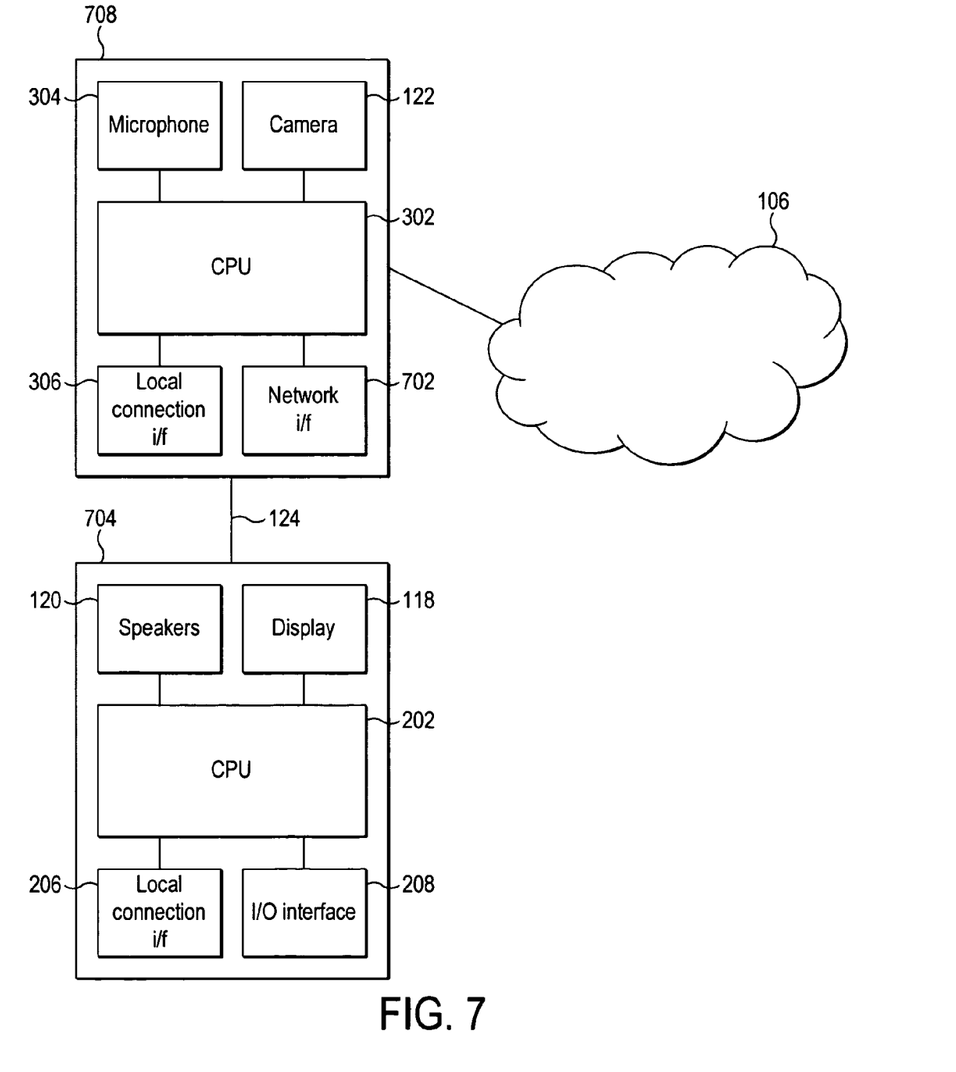
FIG. 7 shows a packet-based communication system according to a second embodiment.

In a second embodiment shown in FIG. 7, the peripheral device 708 includes a network interface 702 for connecting to the network 106 and the device 704 does not include a network interface. Other elements of the embodiment shown in FIG. 7 are the same as those described above (and as shown in FIGS. 1 to 3) and are not described in further detail here.

When the network interface is in the peripheral device 708 then the peripheral device 708 is used to connect to the network 106 and data is communicated between the device 704 and the network 106 via the local connection 124 and the network interface 702.

Figure 8:
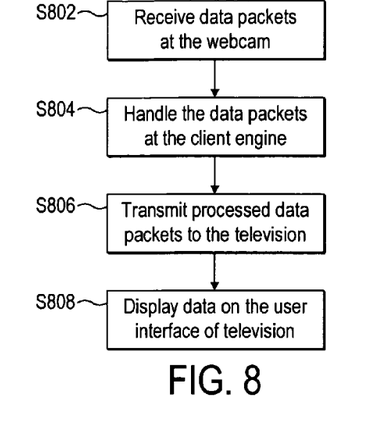
FIG. 8 shows a flowchart of a process for receiving and displaying data according to the second embodiment.

With reference to FIG. 8, there is now described the operation of the communication system in the second preferred embodiment. At step S802 the data packets are received at the webcam 708. The data packets are received via the network interface 702 of the webcam 708. At step S804 the client engine 312 is executed on the CPU 302 of the webcam 708 in order to handle the data packets in accordance with protocols of the P2P communication system. When the client engine 312 has processed the data packets, if the data contained in the data packets is intended to be conveyed to the user 102 then at step S806 the processed data packets are sent from the webcam 708 to the television 704 using the local connection 124 via the local connection interface 306 of the webcam 708 and the local connection interface 206 of the television 704. In step S808 the processed data packets received at the television 704 can be conveyed to the user 102. The method described above allows data received from the network 106 to be conveyed to the user 102.

The methods and systems described above advantageously limit the amount of data that is sent via the local connection. In embodiments of the invention where the peripheral device is a data capture device it is desirable to compress the data captured by the peripheral device for transmission over both the local connection and the network. By providing the communication client in the data capture device, data may be encoded in dependence on conditions on the P2P network—for example the client engine may communicate network conditions e.g. channel bandwidth, to the voice and video encoders of the peripheral device—in this case the encoders may encode the data at a lower bit rate if the channel bandwidth is low. Furthermore the client engine may make further decisions that affect the data rate, for example the client may chose not to send data packets in dependence on network conditions. As such, when the network interface is in the TV (as shown in FIG. 2) and data is sent to the network from the peripheral device via the local connection 124, the data will be compressed as far as possible. If however the network interface resides in the peripheral device (as shown in FIG. 7), the data captured from the peripheral device (e.g. webcam) can be sent directly to the network without having to send this data via the local connection (unless a preview view is required in which case the client engine can send a preview view over the local connection to the television so that the user of the television can see an image of the data that is to be sent). Furthermore any data received from the network may be provided over the local connection to the television as encoded data since there is a decoder in the television.

Other technical advantages provided by executing the communication client in the data capture device include: (i) improved real-time scheduling of communication applications on a dedicated processor and operating system in the peripheral device (e.g. webcam) than on a general purpose PC; and (ii) improved synchronization between audio and video data streams in the communications system.

While this invention has been particularly shown and described with reference to preferred embodiments, it will be understood to those skilled in the art that various changes in form and detail may be made without departing from the scope of the invention as defined by the appendant claims. For example, it will be appreciated that embodiments of the invention described herein can be employed in an IM system, a VoIP system, a video call system or any combination thereof.

What is claimed is:

1. A method of communicating over a network using a first device and a peripheral device, the first device comprising a user interface and a network interface for connecting to the network, the peripheral device having a local connection to the first device, the local connection being independent of the network, the method comprising:
   receiving data packets from the network at the network interface of the first device;
   forwarding the received data packets from the first device to the peripheral device via the local connection;
   executing a client engine of a communication client on a processor of the peripheral device to process the received data packets, wherein the communication client executing on the processor of the peripheral device is configured to control a user interface associated with the first device; and sending processed data packets from the peripheral device to the first device via the local connection such that data contained in the received data packets is conveyed to a user of the first device using the user interface of the first device.

2. The method as claimed in claim 1 wherein the peripheral device is a data capture device.

3. The method of claim 1 wherein the received data packets are encoded and the method further comprises decoding the processed data packets at a decoder of the first device.

4. The method of claim 1 further comprising:
capturing data from the user at the peripheral device;
processing the captured data using the client engine of the client at the peripheral device;
sending the captured data to the first device via the local connection; and
forwarding the captured data from the first device to the network using the network interface.

5. The method of claim 1 further comprising storing user data on the peripheral device.

6. The method of claim 1 wherein the received data comprises at least one of video data and audio data.

7. A system for communicating over a network comprising:
a first device configured to connect through a local connection to a peripheral device, the local connection being independent of the network, the first device comprising:
user interface means;
network interface means for connecting to the network and for receiving data packets from the network;
means for forwarding the received data packets from the first device to the peripheral device via the local connection; and
means for receiving processed data packets from the peripheral device via the local connection such that data contained in the received data packets is conveyed to a user of the first device using the user interface means,
wherein the first device does not include a client engine of a communication client; and
the peripheral device comprising:
means for receiving the received data packets from the first device via the local connection;
processing means for executing a client engine of a communication client to process the received data packets; and
means for sending processed data packets to the first device via the local connection.

8. The system as claimed in claim 7 wherein the peripheral device is a data capture device.

9. The system of claim 7 wherein the peripheral device is not connected directly to the network.

10. The system of claim 7 wherein the user interface of the first device is a client user interface of the communication client executed on a processor of the first device.

11. The system as claimed in claim 10 wherein client user interface of the communication client executed on the processor of the first device is retrieved from the peripheral device by an operating system of the first device together with driver software for the peripheral device.

12. The system of claim 7 wherein the user interface of the first device is a native user interface of the first device, the native user interface being independent of the communication client.

13. The system of claim 7 wherein the user interface of the first device is downloaded from a web server.

14. The system of claim 7 wherein an application programming interface is arranged to handle communication between the user interface of the first device and the client engine.

15. The system as claimed in 14 wherein the application programming interface executed on the processor of the first device is retrieved from the peripheral device by an operating system of the first device together with driver software for the peripheral device.

16. The system of claim 7 wherein the peripheral device is detachable from the first device.

17. The system of claim 7 wherein the peripheral device is integrated with the first device.

18. The system of claim 7 wherein the first device is a television and the peripheral device is a webcam.

19. The system as claimed in claim 7, wherein the communication client executing on the peripheral device is further configured to send user interface notifications to the user interface means of the first device.

20. A peripheral device for communicating over a network, the peripheral device comprising:
means for receiving data packets from a first device via a local connection that is independent of the network, the data packets originating from the network;
processing means for executing a client engine of a communication client to process the received data packets, wherein the communication client is further configured to control a user interface associated with the first device; and
means for sending processed data packets to the first device via the local connection, the processed data packets being for conveying data contained in the received data packets to a user of the first device.

21. A peripheral device as claimed in claim 20 wherein the peripheral device is a data capture device.

22. A peripheral device as claimed in claim 20 wherein the peripheral device further comprises:
driver software; and
user interface software, wherein the driver software and the user interface software are provided for installation on the first device.

23. A peripheral device as claimed in claim 22 wherein the user interface software comprises either a user interface of the communication client or application programming interface for handling communication between the client engine and a third party user interface.

24. A peripheral device as claimed in claim 23 wherein the third party user interface is downloaded from a web server.

25. A method of communicating over a network using a first device and a peripheral device, the first device comprising a user interface and a network interface for connecting to the network, the peripheral device having a local connection to the first device that is independent of the network, the method comprising:
receiving data at the peripheral device;
encoding the received data at the peripheral device;
executing a client engine of a communication client on a processor of the peripheral device to process the received data packets, wherein the communication client is further configured to control at least part of the user interface associated with the first device;
sending the processed data packets from the peripheral device to the first device via the local connection; and
forwarding the received data packets from the first device to the communication network via the network interface.

26. A method of establishing a bidirectional communication over a network using a first device and a peripheral device, the first device comprising a user interface, the peripheral device comprising a network interface for connecting to the network and a local connection to the first device that is independent of the network, the method comprising:
  receiving data packets from the network at the network interface of the peripheral device;
  executing a client engine of a communication client on a processor of the peripheral device effective to process the received data packets, identify a type of data associated with the received data packets, and determine an appropriate module of the first device to send the received data packets to;
  sending, based at least in part on the identified type of data, processed data packets from the peripheral device to the first device via the local connection; and
  decoding the data at the first device such that data contained in the received data packets is conveyed to a user of the first device using the user interface of the first device; and wherein the method further comprises:
  receiving data at the peripheral device;
  encoding the received data at the peripheral device;
  executing a client engine of a communication client on a processor of the peripheral device to process the received data packets;
  sending the processed data packets from the peripheral device to the first device via the local connection; and
  forwarding the received data packets from the first device to the communication network via the network interface.

27. A system for communicating over a network comprising:
  a first device having a local connection to a peripheral device, the local connection being independent of the network, the peripheral device comprising:
  network interface means for connecting to the network and for receiving data packets from the network;
  processing means for executing a client engine of a communication client to process the received data packets;
  means for sending a client user interface application to the first device for execution; and
  means for sending processed data packets to the first device via the local connection,
  wherein the first device further comprises:
    means for receiving the processed data packets from the peripheral device;
    means for retrieving the client user interface application on the peripheral device;
    responsive to retrieving the client user interface application, means for executing the client user interface application on the first device;
    means for decoding the processed data packets; and
    user interface means for conveying data contained in the processed data packets to a user of the first device.

* * * * *